(12) United States Patent
Mack (10) Patent No.: US 8,547,055 B2
(45) Date of Patent: Oct. 1, 2013

(54) METHOD AND APPARATUS TO CONTROL ELECTRIC POWER CONSUMPTION

(75) Inventor: David Mack, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1592 days.

(21) Appl. No.: 11/685,913

(22) Filed: Mar. 14, 2007

(65) Prior Publication Data

US 2008/0224663 A1    Sep. 18, 2008

(51) Int. Cl.
*H02J 7/14* (2006.01)
*H02J 7/00* (2006.01)

(52) U.S. Cl.
USPC ........... 320/104; 320/109; 320/132; 320/134; 320/136; 903/903; 903/904; 903/907; 180/65.21; 180/65.1

(58) Field of Classification Search
CPC .................................................. Y02T 10/7005
USPC ......................................... 320/135, 136, 104
See application file for complete search history.

(56) References Cited

U.S. PATENT DOCUMENTS

| | | | |
|---|---|---|---|
| 4,853,553 A | 8/1989 | Hosie | |
| 5,247,205 A * | 9/1993 | Mototani et al. | 307/66 |
| 5,416,702 A | 5/1995 | Kitagawa et al. | |
| 5,507,153 A * | 4/1996 | Seto et al. | 62/133 |
| 6,048,288 A | 4/2000 | Tsujii et al. | |
| 6,628,006 B2 | 9/2003 | Oglesby et al. | |
| 6,688,121 B2 * | 2/2004 | Tada et al. | 62/134 |
| 6,897,629 B2 | 5/2005 | Wilton et al. | |
| 6,927,500 B2 | 8/2005 | Iwanami et al. | |
| 6,989,644 B2 * | 1/2006 | Kim | 318/400.31 |
| 2004/0189091 A1 * | 9/2004 | Algrain et al. | 307/10.1 |

FOREIGN PATENT DOCUMENTS

EP    1 318 697 B1    2/2005

* cited by examiner

*Primary Examiner* — Edward Tso
*Assistant Examiner* — Ahmed Omar
(74) *Attorney, Agent, or Firm* — Brooks Kushman P.C.; David B. Kelley (57) ABSTRACT

A system and method for controlling the electrical power consumption of an accessory device. A power transmission unit is adapted to generate electrical power. The system comprises a first controller, a current sensor and a second controller. The first controller is adapted to control the operation of the accessory device. The current sensor is configured to measure an amount of current being charged and discharged to and from the battery and generate a signal that corresponds to the measured amount of current charged and discharged to and from the battery. The second controller is configured to receive the signal from the current sensor and generate flag signal in response to detecting that current is being charged to the battery. The first controller is further adapted to control the accessory device to consume increased power from the electrical power generated by the power transmission unit in response to the flag signal.

19 Claims, 4 Drawing Sheets

_Fig-3_

_Fig-4_

_Fig-5_

_Fig-6_

_Fig-7_

_Fig-8_

US 8,547,055 B2

METHOD AND APPARATUS TO CONTROL ELECTRIC POWER CONSUMPTION

BACKGROUND OF THE INVENTION

1. Field of the Invention

Embodiments of the present invention generally relate to electrical load control of accessories in a vehicle.

2. Background Art

Keeping power losses to a minimum helps to increase fuel economy for vehicles. It is generally well known that vehicle electrical accessory devices (or loads) use a significant amount of power and that keeping power losses associated with vehicle electrical accessory usage to a minimum may increase fuel economy for a vehicle. Hybrid electric vehicles utilize a high voltage battery a fuel power engine, and regenerative braking for sources of power. Each of these sources may or may not be actively outputting power during various operating modes of the HEV. During periods of high wheel torque demand, the engine and battery may both be providing power to the wheels to meet high wheel torque demand. Any electrical accessory device that are on must continue to be powered during moments of high wheel torque demand.

Some HEVs prioritize the use of power and assign a higher priority to wheel torque over the use of power needed to drive electrical accessory devices. As a result, select electrical accessory devices may be shut down or limited for periods of time with the intent of making more power available to meet the needed wheel torque demand. Such high wheel torque demands may involve instances in which the vehicle is quickly accelerating, or when the vehicle is climbing a hill. In moments of low torque demand, the engine may generate power which may be used to charge the high voltage battery in addition to providing power to the wheels and electrical accessory devices.

In other HEV operating modes the engine is off, and stored power in the battery is used to provide power to the wheels and the electrical accessory devices. At other times, power may be generated when the vehicle performs regenerative braking. The electrical power generated from regenerative braking is also used to charge the high voltage battery and power the electrical accessory devices.

While conventional methods control the usage of electrical accessory devices without considering the source of the power being used, such an approach may not be efficient since an energy loss may be attributed to storing electrical power in the battery and then using the stored power as opposed to directly using power generated by the engine or regenerative braking.

Accordingly, it would be desirable to implement a system and method that recognizes when the vehicle is in an efficient state in order apply an increased power level to drive an accessory device, and to reduce inefficiencies associated with using stored electrical power from the battery to drive the accessory device.

SUMMARY OF THE INVENTION

In one non-limiting embodiment, a system and method is provided for controlling the electrical power consumption of an accessory device in a vehicle having an engine, a battery and a power transmission unit are provided. The power transmission unit is adapted to generate electrical power. The system comprises a first controller, a current sensor and a second controller. The first controller is adapted to control the operation of the accessory device. The current sensor is configured to measure an amount of current being charged and discharged to and from the battery and generate a signal that corresponds to the measured amount of current charged and discharged to and from the battery. The second controller is configured to receive the signal from the current sensor and generate a flag signal in response to detecting that current is being charged to the battery. The first controller is further adapted to control the accessory device to consume increased power from the electrical power generated by the power transmission unit in response to the flag signal.

DETAILED DESCRIPTION OF THE PREFERRED EMBODIMENT(S)

Figure 1:
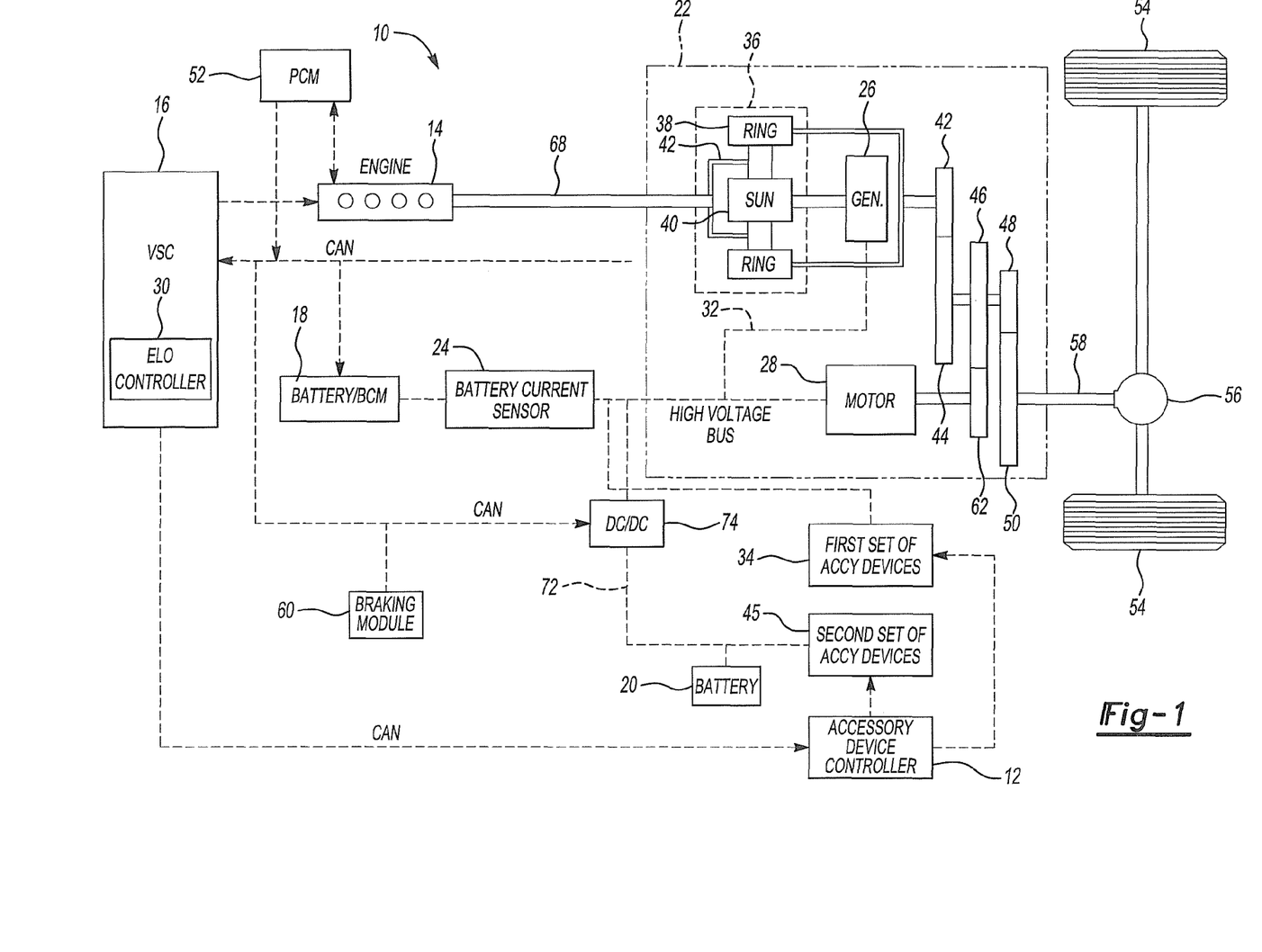
FIG. 1 is a diagram illustrating a HEV system in accordance with one embodiment of the present invention.

Referring to FIG. 1, a hybrid vehicle system 10 is shown in accordance to one embodiment of the present invention. In general, the system 10 may be related to a parallel-series hybrid vehicle (PSHEV) system, a series hybrid electric vehicle (SHEV), a parallel hybrid electric vehicle (PHEV), and a fuel cell hybrid vehicle (FCHEV). The system 10 includes a gasoline-fueled internal combustion engine (ICE) 14, a vehicle system controller (VSC) 16, a high voltage battery 18, and a low voltage battery 20.

The internal combustion engine 14 and high voltage battery 18 are coupled to the vehicle driveline through an power transmission unit 22 having a first motor/generator 26 and a second motor/generator 28. The first motor/generator 26 functions primarily as a generator and the second motor/generator 28 functions primarily as a motor. The high voltage battery 18 is configured to store electrical energy produced by the first motor/generator 26 or the second motor/generator 28. A power train control module (PCM) 52 controls the operation of the internal combustion engine 14. A braking module 60 communicates with the VSC 16 to coordinate the use of foundation brakes with regenerative braking.

The internal combustion engine 14 is generally referred to as a power generating device and the high voltage battery 18 may be referred to as a power storage device. The motor/generator 26 and the motor/generator 28 may generate power in response to the engine 14 or when the vehicle performs regenerative braking. The motor/generator 26 and the motor/generator 28 may also generate power in response to receiving charge power from the battery 18.

The power generating device, for example, can be any internal combustion engine, including but not limited to gasoline, diesel, hydrogen, methanol, natural gas, ethanol or other gas or liquid-fueled internal combustion engine. Alternatively, the power generating device can be a fuel cell engine, such as a hydrogen-powered fuel cell engine. The power storage device likewise is not limited to a battery and may include ultra-capacitors or hydraulic accumulators.

The power transmission unit 22 includes a planetary gearset 36, which includes a ring gear 38, a sun gear 40 and a planetary carrier assembly 42. The ring gear 38 couples the first motor/generator 26 to the vehicle drivetrain via step ratio gears/meshing gear elements 42, 44, 46, 48 and 50. The sun gear 40 and the planetary carrier assembly 42 likewise couple the internal combustion engine 14 and motor/generator 26, respectively, to the vehicle drivetrain (shown as vehicle traction wheels 54, and differential and axle mechanism 56) via a torque output shaft 58 of the power transmission unit 22. Gears 44, 46, and 48 are mounted on a countershaft. A motor-driven gear 62 engages the gear 46. Electric motor 28 drives gear 62, which acts as a torque input for the countershaft gearing.

The system 10 may be configured via the VSC 16 to operate in a number of different modes. Such modes may include the vehicle utilizing power from the engine 14 or high voltage battery 18, either separately or combined. Additional modes may include engine power being used to charge the battery 18. In an electric drive mode, a vehicle is operated from power discharged from the battery 18.

In the electric drive mode, the internal combustion engine 14 is generally shut off. While in the electric drive mode, tractive force is delivered by an electric propulsion system that includes the high voltage battery 18 and the motor/generator 28.

The foregoing, generally, describes the means for driving the vehicle using one or both of the engine 14 and the high voltage battery 18. In addition, the system 10 may also be used to drive accessory devices for the vehicle. Such accessory devices include first and second sets of accessory devices 34 and 45. An accessory device controller 12 may control the operation of the first and second sets of accessory devices 34 and 35.

The VSC 16 includes an electrical load optimization (ELO) controller 30 that is adapted to provide a flag signal (e.g., FLAG=1) to the device accessory controller 12 to indicate when the engine 14 is providing power, or when the vehicle is performing regenerative braking (or when the vehicle is in any efficient state such that increased power consumption may be used by the first and second sets of accessory device 34 and 35 with power generated in response to the engine running or by regenerative braking). In general, it is more efficient for the electrical accessory devices of the vehicle to directly consume power generated from the engine 14 or power generated as a result of the vehicle performing regenerative braking (via the power transmission unit 22) as opposed to the electrical devices consuming stored power from the battery 18. An energy loss is generally attributed to storing electrical power in the battery 18 and then discharging the stored electrical power in order to power the accessory devices 34, 35.

As noted above, the ELO controller 30 determines when power is being generated by the engine 14 or when power is generated in response to performing regenerative braking to take advantage of the free flow of energy produced by such power sources. In response to determining that power is being generated by the engine 14 or power is being generated when the vehicle performs regenerative braking, the ELO controller 30 provides the flag signal to the accessory device controller 12 to indicate that power is being generated by the engine 14 or by the act of performing regenerative braking. In such an efficient state, the accessory device controller 12 biases control of the first and second accessory devices 34 and 45 such that first and second accessory devices 34 and 45 consume more power. In the event the ELO controller 30 determines that power is being supplied by from the battery 18, the vehicle may be in an inefficient state to operate the accessory devices 34, 45. The ELO controller 30 provides the flag signal to the accessory device controller 12 to indicate that power is being provided by the battery 18 and that the vehicle is in an efficient state. In response, the accessory device controller 12 biases control of the accessory devices 34, 45 such that less power is consumed. Depending on the particular type of accessory devices 34, 35 implemented in the vehicle, the accessory device controller 12 may bias control of the accessory devices 34, 35 to use less power by turning the accessory devices 34, 45 off or by reducing the speed of the accessory device (e.g., fan or pump) until a predetermined upper or lower limit is achieved. The conditions used by the ELO controller 30 to determine whether the vehicle is in efficient or inefficient states will be discussed in more detail in connection with FIG. 2.

The battery 18 includes a battery control module (BCM) that is operable to detect the amount of charge (or the state of charge (SOC)) of the battery 18. A high voltage bus 32 couples the first and second motor/generators 26 and 28 to the high voltage battery 18. In one non-limiting example, the motor/generator 26 may provide a voltage of 300 V. The amount of voltage generated by the motor/generators 26 and/or 28 and transmitted over the high voltage bus 32 may be varied depending on the various operating modes of the system 10. A battery current sensor 24 is configured to detect the amount of current that is charged and discharged to and from the battery 18.

The first set of accessory devices 34 may be coupled to the high voltage bus 32. The first set of accessory devices 34 may be driven by the battery 18 or directly from the motor/generator 26 or the motor/generator 28 (e.g., when power is being provided by the engine 14 or power is generated in response to the vehicle performing regenerative braking). In various non-limiting examples, the first set of accessory devices 34 may include an electric A/C compressor, an electric power steering pump, and a DC/DC converter. The particular types of accessory devices included in the first set of accessory devices 34 may be varied based on the design criteria of a particular implementation. The first set of accessory devices 34 may include additional loads generally associated with an electric vehicle or hybrid electric vehicle.

A low voltage bus 72 may be coupled to the second set of accessory devices 45. A DC/DC converter 74 is provided to control the transfer of energy (or step down the voltage) to the low voltage bus 72 from the high voltage bus 32. In such a manner, power delivered from the high voltage battery 18, or the engine 14 may be delivered from the high voltage bus 32 to the low voltage bus 72. Additionally, power generated as a result of the vehicle performing regenerative braking may be delivered from the high voltage bus 32 to the low voltage bus 72. A low voltage battery 20 may be charged via the voltage on the low voltage bus 72.

The accessory device controller 12 may include one or more controllers for controlling the various accessory devices within the first and second sets of accessory devices 34, 45. The second set of accessory devices 45 generally includes any type of accessory device that is generally powered from the low voltage bus 72. Various non-limiting examples of accessories driven off of the low-voltage bus 72 may include and is not limited to motor electronics coolant pump(s), engine cooling fan(s), battery cooling fan(s), brake vacuum pump, heated seats, heated mirrors, and heated window defrost. The particular type of accessory devices included in the second set of accessory devices 45 may be varied based on the design criteria of a particular implementation. The various accessory loads which comprise the first and second sets of accessory devices 34, 45 may each be selectively turned on or off or bias controlled to increase or decrease power use level in response to the accessory device controller 12.

A multiplexed bus is coupled between the VSC 16, the PCM 52, the BCM 18, the DC/DC converter 74 and the accessory device controller 12. Such a multiplexed bus may be adapted to support a multiplexed communication protocol. In one non-limiting example, the multiplexed bus may be implemented as a high speed controller area network (CAN). In another non-limiting example, the multiplexed bus may be implemented as a local interconnect network (LIN). The system 10 may be adapted to incorporate any multiplexed communication protocol on the multiplexed bus.

In general, the accessory device controller 12 may control the first and second accessory devices 34, 45 in response to multiplexed messages received on the CAN bus. In one non-limiting example, the accessory device controller 12 may bias the control of the first and second accessory devices 34, 45 such that corresponding accessory devices consume more power when the vehicle is in the efficient state in response to receiving the flag signal from the ELO controller 30 over the CAN bus. When the vehicle is in the inefficient state (e.g., the battery 70 is providing charged power), the accessory load controller 12 may bias or control the first and second accessory devices 34, 45 in response to receiving the flag signal (e.g., FLAG=0) from the ELO controller 30 over the CAN bus to consume less power.

Figure 2:
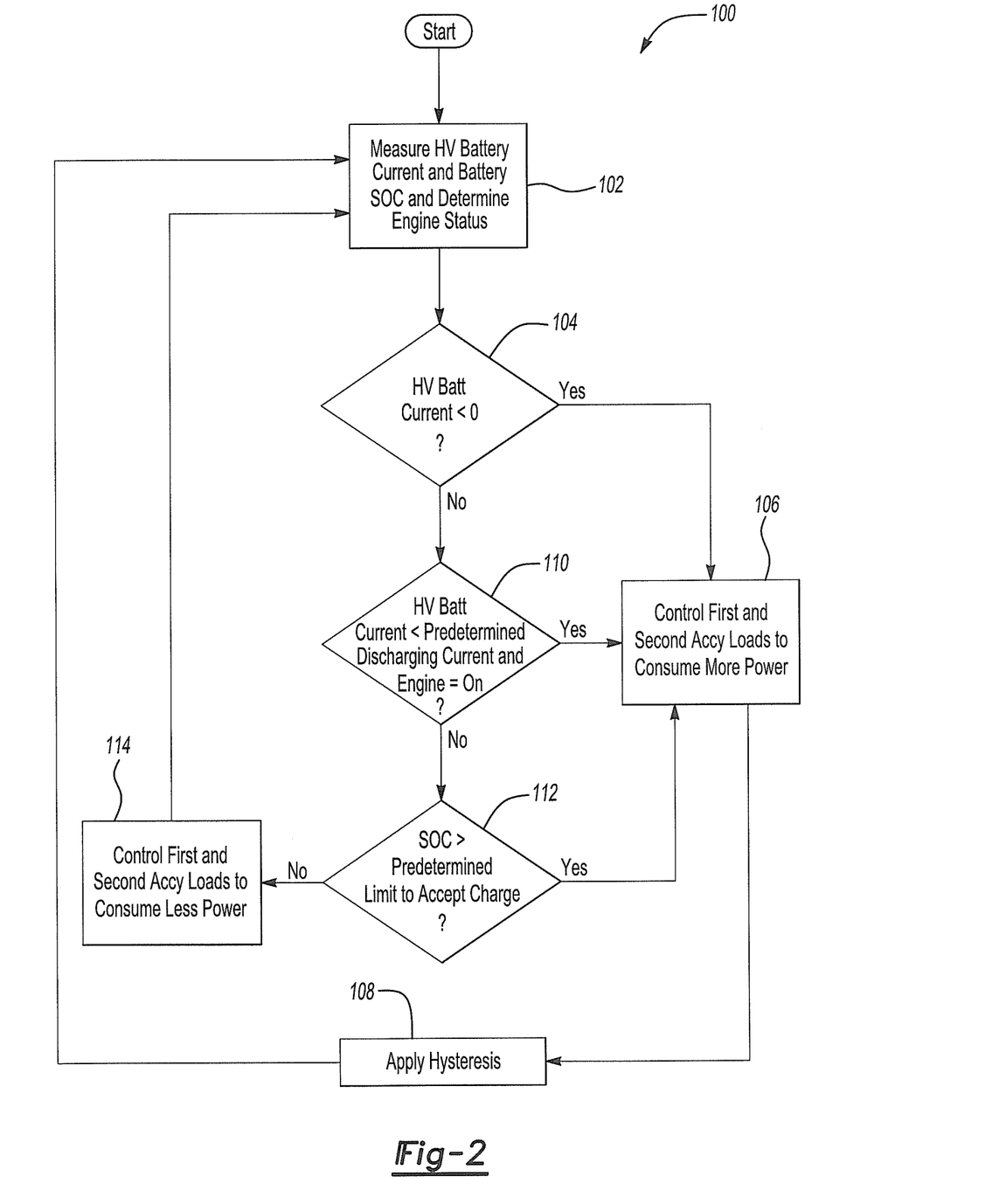
FIG. 2 is a flow diagram illustrating a method for controlling electrical power in one or more accessory devices in accordance with one embodiment of the present invention.

Referring to FIG. 2, a flow diagram 100 for controlling electrical power for one or more accessory devices is shown in accordance with one embodiment of the present invention. In step 102, the battery current sensor 24 measures the amount of current that flows to and from the battery 18. The BCM 18 reads the measured amount of current from the battery current sensor 24 and transfers the measured amount of current to the ELO controller 30 via the CAN bus. In general, the battery 18 may be charged when the engine 14 is running or when the vehicle is performing regenerative braking. The battery 18 may be discharging current when the engine 14 is off in the electric drive mode or when the engine 14 is on and when the battery 18 needs to assist the engine 14 in achieving increased acceleration or enables the vehicle to climb a hill. The BCM 18 detects the state of charge of the battery 18 and presents the state of charge to the ELO controller 30 over the CAN bus. In one non-limiting example, the PCM 52 determines the status of the engine 14 and sends the status of engine 14 to the ELO controller 30 over the CAN bus. In another non limiting example, the VSC 16 may determine the engine on/off status in response to signals received by the PCM 52. The ELO controller 30 may infer that when current is being charged to the battery 18, power is being generated by the power transmission unit 22 via the engine 14 or by the vehicle performing regenerative braking.

In general, the current sensor 24 may measure the amount of current that is flowing into and out of the battery 18. If current is flowing into the battery 18, the current sensor 24 may designate the measured current as a negative value. Such a condition is generally indicative of the battery 18 being in a charging state. If current is flowing out of the battery 18, the current sensor 24 may designate the measured amount of current as a positive value. Such a condition is generally indicative of the battery 18 being in a discharging state. The designation of a negative current value as being indicative of the battery 18 being in a charging state and a positive current value as being indicative of the battery 18 being in a discharging state may be switched and varies based on the design intent of a particular implementation. For example, the system 10 may designate the measured current that is flowing into the battery 18 as a positive value and the measured current that is flowing out of the battery as a negative value.

In step 104, the ELO controller 30 determines if current is being charged to the battery 18 (e.g., if the flow of current to/from the battery 18 is less than zero). If current is flowing into the battery 18, then the method moves to step 106. In step 106, the ELO controller 30 determines that the vehicle is in an efficient state such that the ELO controller 30 controls the accessory load controller 12 to bias control of the various accessory loads within first and second accessory devices 34, 45 toward increased operation in order to consume the power generated from the power transmission unit 22 via the engine 14 or from the act of the vehicle performing regenerative braking. The ELO controller 30 generates and presents the flag signal to the accessory device controller 12 to indicate that the system 10 is in an efficient state. In such a state, the battery 18 may also be charged and consume power while the first and second accessory devices 34,45 consume additional power from the power generated by the electrical power transmission unit 22.

If the current is being charged to the battery 18, then the diagram 100 moves to step 110. In step 110, the ELO controller 30 determines whether the amount of current that is being discharged from the battery 18 is less than a predetermined amount of current and whether the engine 14 is running. In one non-limiting example, the predetermined amount of current may be a positive value in the range of between 0 and 4 amps. If the amount of current that is being discharged from the battery 18 is less than the predetermined amount of current and the engine 14 is running, the ELO controller 30 generates and presents the flag signal to the accessory device and the method moves to step 106. In step 106, the ELO controller 30 determines that the vehicle is in an efficient state such that the ELO controller 30 controls the accessory load controller 12 to bias control of the various accessory loads within first and second accessory devices 34, 45 toward increased operation in order to consume the power generated from the power transmission unit 22 via the engine 14.

If the conditions of step 110 are satisfied, such conditions may indicate that VSC 16 is controlling the system to achieve a battery charge neutral state. A charge neutral state may be detected if the amount of current that is being discharged from the battery 18 is less than the predetermined amount of current and the engine 14 is running. While the VSC 16 controls the system 100 to reach the charge neutral state, the amount of current being discharged or charged to the battery 18 may be close to zero (either a positive or negative value). The battery 18 may have a full charge or be close to having a full charge or close to a target state-of charge (SOC) state. While the VSC 16 controls the battery 18 to a charge neutral state, it may be more efficient to bias control the accessory devices 34, 45 to consume more power while power is being generated directly by the motor/generator 26 or 28 (particularly in the case where the engine 14 is on and/or the vehicle is performing regenerative braking). In such a condition, the system 10 is adapted to take advantage of the energy being generated by the motor/generators 26, 28 without experiencing any power loss due to using power previously stored in the battery 18. As noted in connection with FIG. 1, the system 10 encounters some power loss by storing and then using energy from the battery 18, as opposed to directly applying the energy generated by the motor/generators 26, 28 to the accessory devices 34, 45.

In step 112, the ELO controller 30 determines whether the SOC of the battery 18 is greater than a predetermined threshold. The BCM 18 presents the SOC to the ELO controller 30 via the CAN bus. In another embodiment, the ELO controller 30 may use battery charge and discharge limits as in indicator to determine when the system 10 drives the first and second accessory devices 34, 45 from the battery 18. In such a condition, the BCM 18 may provide the charge/discharge power limits in watts to the ELO controller 30. A charge power limit that is close to zero along with a discharge power limit with a predetermined range may generally correspond to the battery 18 being in a highly charged state such that the battery 18 may not accept power. In contrast, an SOC that is close to 75% generally corresponds to the battery 18 being in a highly charged state.

If the ELO controller 30 determines that the SOC of the battery 18 is greater than the predetermined threshold, then the ELO controller 30 generates and presents the flag signal to the accessory device controller 12. In step 106, the accessory device controller 12 selectively controls the various accessory loads within first and second accessory devices 34, 45 in response to the flag signal. Once the first and second accessory devices 34, 45 are enabled, the first and second accessory load 34, 45 may use the electrical power generated by the power transmission unit 22 or use power stored from the battery 18. The consumption of stored power from the battery 18 is generally not as efficient as opposed to using power generating directly from the power transmission unit 22. However, in such a condition where the battery 18 is charged to such a high level that the battery 18 may not accept additional charging, then the ability of the battery 18 to accept regenerative braking power may be disabled/inhibited. Allowing electrical devices to use stored battery power in such a condition assists in discharging the battery 18 to a level that will allow the battery 18 to accept charging power and allow regenerative braking.

If the SOC is less than the predetermined threshold, the method moves to step 114. In step 114, the accessory device controller 12 controls the accessory devices 34, 45 to use less (or a minimum amount) of power. The accessory device controller 12 may drive the different accessory device 34 and 45 at varying load levels to accommodate the various accessory device or function.

In step 108, the ELO controller 30 may be configured to drive the accessory device controller 12 for a predetermined amount of time to prevent undesired switching (e.g., rapid toggling between on and off states) of the accessory devices 34, 45 in the event the system 10 rapidly switches into and out of efficient states. In one non-limiting example, the first and second accessory devices 34, 45 may be driven for a minimum time period of between 1 to 5 seconds before the accessory device controller 30 disables control of the accessory devices 34, 45 in the event the vehicle enters into an inefficient state.

It should be noted that while the system 10 monitors the flow of current to determine if the battery is being charged or discharged, the system 10 may also be configured to detect power to determine the charging/discharging state of the battery 14. The ELO controller 30 may generate a flag signal to notify the accessory device controller 12 when the vehicle is in the efficient or inefficient state. The current sensor 24 may present the measured amount of current to the BCM 18. The BCM 18 transmits the measured amount of current and battery voltage to the VSC 16 over the CAN bus. The ELO controller 30 generates the flag signal (e.g., FLAG=1) if the battery power is a negative (e.g., direction of the power is from the power transmission unit 22 to the battery 18). Such a condition corresponds to the battery 18 being in a charging state (e.g., the vehicle being in an efficient state). The ELO controller 30 transmits the flag signal to the accessory device controller 12. The accessory device controller 12 selectively controls the accessory devices 34, 45 to consume increase power from the power transmission unit 22.

If the power is a positive value, such a condition corresponds to the battery 18 discharging power (e.g., the vehicle is in an inefficient state, and the direction of power is flowing from the battery 18). In response to determining that the power is positive, the ELO controller 30 generates the flag signal (FLAG=0) and transmits the flag signal to the accessory device controller 12. In such a condition, the accessory device controller 12 controls the accessory devices 34, 45 to decrease power consumption.

Figure 3:
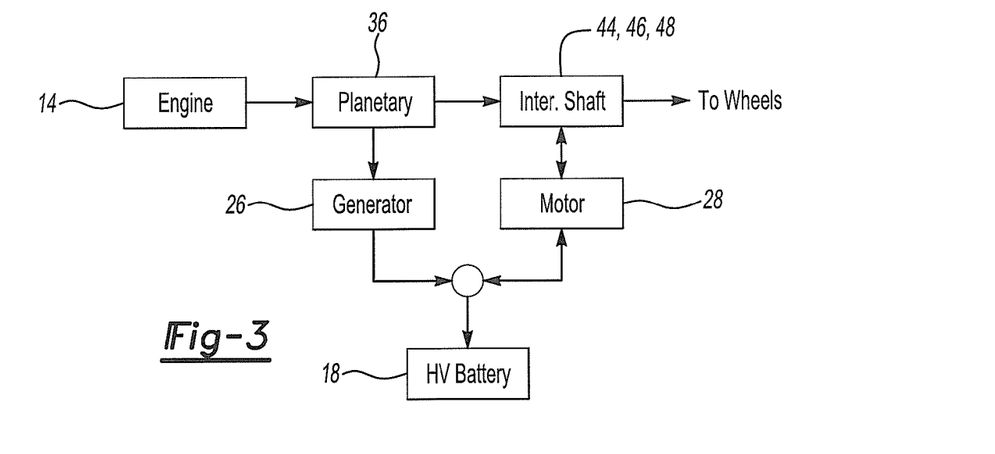
FIG. 3 is a flow diagram illustrating one example of energy flow in the hybrid electric vehicle system.

Referring to FIG. 3, a flow diagram illustrating one example of energy flow in the hybrid electric vehicle system 10 is shown. The engine 14 is running and providing power to the wheels via the planetary gearset 36 and the gear sets 44, 46 and 48. The engine 14 also provides power to the battery 18 via the motor/generator 26. The engine 14 may also provide power to the battery 18 via the motor/generator 28. In the energy flow state as illustrated in FIG. 3, current is flowing to the battery 18 (e.g., the battery is charging) and the value of the current is less than zero. Since the value of the current is less than zero, the ELO controller 30 determines that the vehicle is in an efficient state for electric accessory power use. In response to determining that the vehicle is in an efficient state, the ELO controller 30 presents the flag signal to the accessory device controller 12 to selectively control the first and second set accessory devices 33, 45 to increase power consumption such that the first and second accessory devices 34, 45 takes advantage of being able to consume the electrical power generated by the motor/generator 26 or 28 and not from the stored power in the battery 18.

Figure 4:
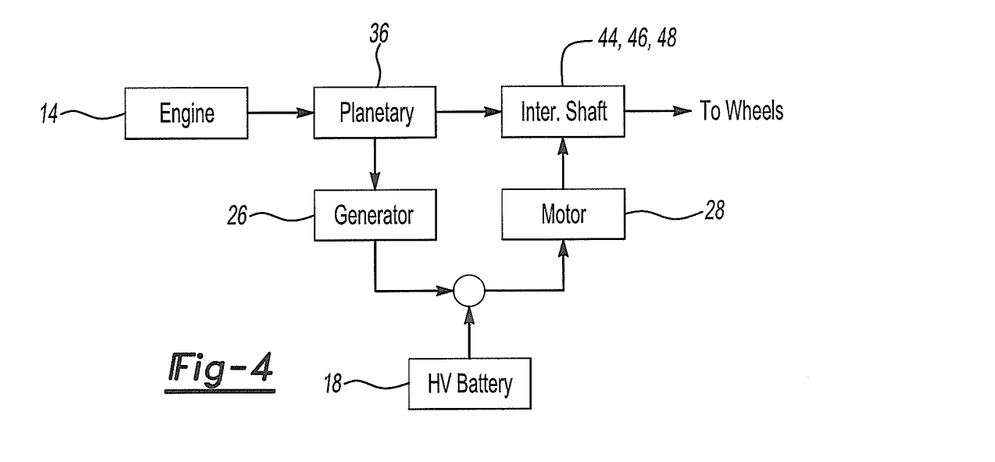
FIG. 4 is a flow diagram illustrating another example of energy flow in the hybrid electric vehicle system.

Referring to FIG. 4, a flow diagram illustrating another example of energy flow in the hybrid electric vehicle system 10 is shown. FIG. 4 illustrates the condition when a high wheel torque demand is needed, for example, to either accelerate the vehicle or assist the vehicle in a climbing a hill. In such a situation, the engine 14 and the battery 18 are providing power to the wheels. The current being discharged from the battery 18 is a value that is greater than the predetermined amount of current. Due to such a condition, the ELO controller 30 determines that it is inefficient to drive the first and second sets of accessory devices 34, 45. The system 10 may inhibit or minimize electrical accessory use.

Figure 5:
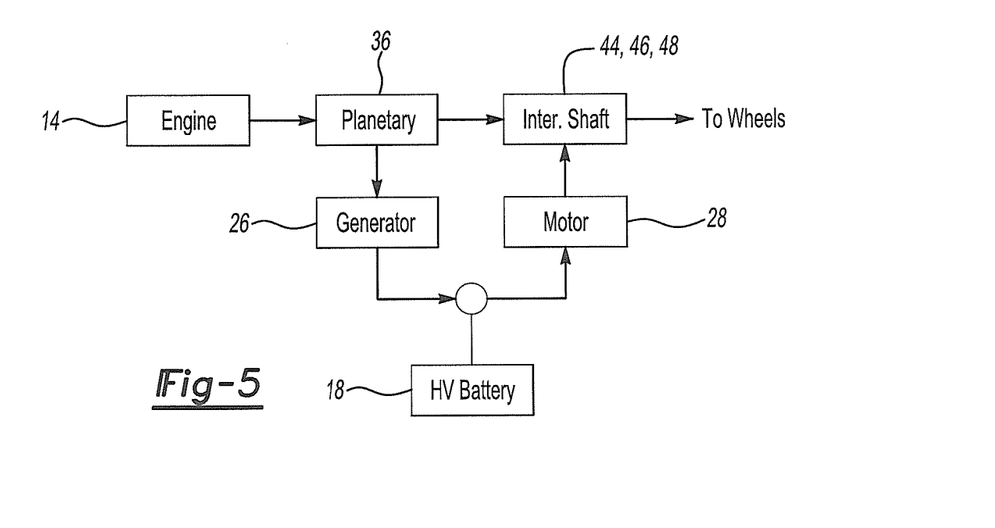
FIG. 5 is a flow diagram illustrating a third example of energy flow in the hybrid electric vehicle system.

Referring to FIG. 5, a flow diagram illustrating a third example of energy flow in the hybrid electric vehicle system 10 is shown. FIG. 5 generally illustrates that the battery 18 is in the charge neutral state. The engine 14 is running and the VSC 30 determines that it may not be necessary to charge or discharge the battery 18 at this time. The current being discharged from the battery 18 may be less than the predetermined amount of current. The ELO controller 30 presents the flag signal to the accessory device controller 12. The accessory device controller 12 selectively controls the operation of first and second sets of accessory devices 34, 45 to increase power consumption and take advantage of being able to directly consume the electrical power generated by the motor/generators 26 and 28.

Figure 6:
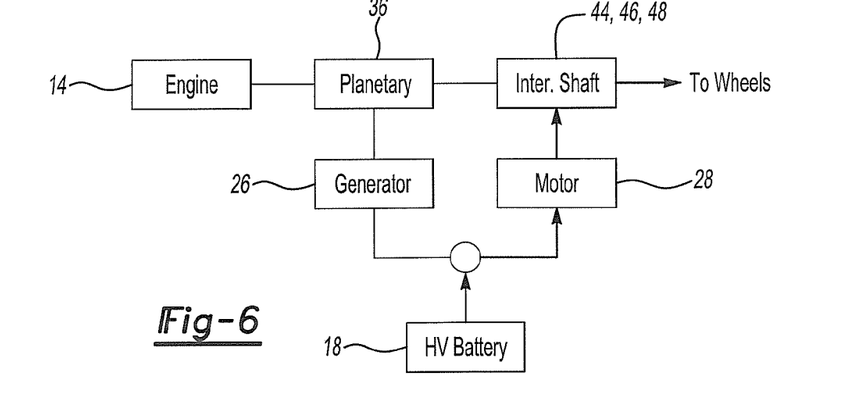
FIG. 6 is a flow diagram illustrating a fourth example of energy flow in the hybrid electric vehicle system.

Referring to FIG. 6, a flow diagram illustrating a fourth example of energy flow in the hybrid electric vehicle system 10 is shown. FIG. 6 generally illustrates that the system 10 is in an electric drive state. In such a state, the engine 14 is off and the battery 18 is providing power to drive the wheels via the motor 28. Since the battery 18 is driving the wheels, the battery 18 is discharging current above the predetermined amount of current. Due to the battery 18 discharging current, the ELO controller 30 determines that it is inefficient to drive the first and second sets of accessory devices 34, 45. The accessory device controller 12 may inhibit electrical accessory load use. The inhibiting of electrical accessory load use may included minimizing or shutting down the electrical accessory load use.

Figure 7:
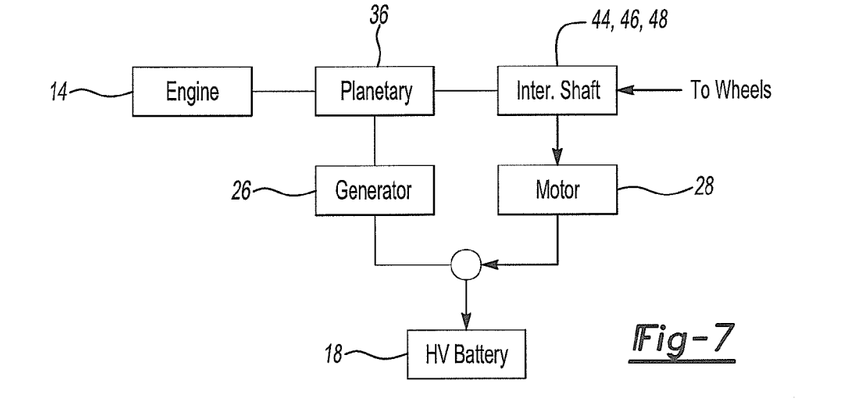
FIG. 7 is a flow diagram illustrating a fifth example of energy flow in the hybrid electric vehicle system.

Referring to FIG. 7, a flow diagram illustrating a fifth example of energy flow in the hybrid electric vehicle system 10 is shown. FIG. 7 generally illustrates that the system 10 is in a regenerative braking state. In such a state, the engine 14 may be on or off and energy provided to the battery 18 is derived from the regenerative braking of the vehicle. The gear elements 44, 46, 48 of the interlocking shaft drives the motor/generator 28 which charges the battery 18. The ELO controller 30 generates and presents the flag signal to the accessory device controller 12. The accessory device controller 12 selectively controls the operation of the first and second sets of accessory devices 34, 45 to increase power consumption and take advantage of being able to directly consume electrical power generated by the motor/generator 28.

Figure 8:
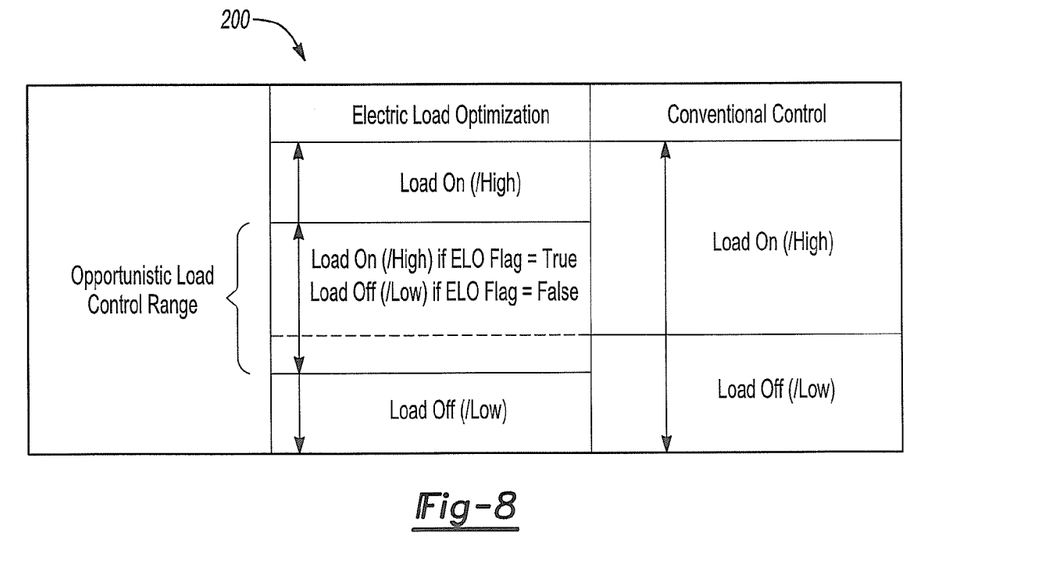
FIG. 8 is a table illustrating the control of one or more accessory loads with the HEV system.

Referring to FIG. 8, a table 200 illustrating the control of the accessory devices 34, 35. In general, the table 200 illustrates that conventional methods of controlling accessory devices generally depend on one or more control parameters with hard points or thresholds that fails to recognize the source of where electrical power is generated. In contrast, the ELO controller 30 is configured to generate the flag signal to indicate when desired power sources are providing power to take advantage of the free flow of energy when produced. The system 10 generally provides an opportunistic load control range as illustrated in Table 200. For example, consider a control parameter for coolant temperature, conventional systems may turn the coolant pump on if coolant temperature exceeds 110 degrees. In contrast, the opportunistic load control range sets an upper and lower limit for coolant temperature, such that if coolant temperature is within such upper and lower limits, then the ELO controller 30 governs the coolant pump on/off state. Otherwise, the pump is ON above the range upper limit, and OFF below the lower limit.

The opportunistic load control generally corresponds as to how the accessory device controller 12 may use the flag signal (generated by the ELO controller 30) to accomplish increasing or decreasing accessory device 34, 45 usage. When the system 10 is in the efficient state (e.g., free flow of energy being derived from the engine 14 or the vehicle performing regenerative braking), the accessory device controller 12 selectively controls the accessory devices 34, 45 to operate or run at a higher rate. If the ELO controller 30 determines that the vehicle is in an inefficient state, the ELO controller 30 notifies the accessory device controller 12 that the system 10 is in an inefficient state such that the accessory device controller 12 reduces load operation (e.g., accessories running at lower rates) or turns off load operation. The particular implementation of determining the opportunistic load control range may vary based on the particular type of accessory devices controlled. However, if the range of the opportunistic load control is exceeded, the accessory device controller 12 operates independent of the ELO controller 30 and maintains a minimum level of functionality that is acceptable for a particular accessory. Additional factors may be incorporated in determining the opportunistic load control range. Such factors may include the use of timers and/or offsets to make the determination.

While the best mode for carrying out the invention has been described in detail, those familiar with the art to which this invention relates will recognize various alternative designs and embodiments for practicing the invention as defined by the following claims.

What is claimed:

1. A method for controlling the electrical power consumption of an accessory device having first and second portions in a vehicle having an engine, a battery, and a power transmission unit adapted to generate electrical power, the method comprising:
   determining an amount of current that is being charged and discharged to and from the battery; and
   operating the accessory device in response to determining that current is being charged to the battery such that accessory device consumes increased power from the electrical power generated by the power transmission unit.

2. The method of claim 1, further comprising determining an on/off status of the engine and increasing the operation the accessory device in response to determining that the amount of current being discharged from the battery is less than a predetermined amount of current and the on/off status of the engine is in an on state such that the accessory device consumes increased power from the electrical power generated by the power transmission unit.

3. The method of claim 2, further comprising inhibiting the operation of the accessory device in response to determining that the amount of current being discharged from the battery is greater than a predetermined amount of current.

4. The method of claim 1, further comprising determining a state of charge of the battery and operating the accessory device in response detecting that the state of charge of the battery is greater than a predetermined threshold such that the accessory device consumes increased power from the battery.

5. The method of claim 1, further comprising delivering the electrical power generated by the power transmission unit over a high voltage bus to the first portion of the accessory device.

6. The method of claim 5, further comprising stepping down the electrical power generated by the power transmission unit over the high voltage bus to produce stepped down electrical power.

7. The method of claim 6, further comprising delivering the stepped-down electrical power over a low voltage bus to a low voltage battery and the second portion of the accessory device.

8. A method for controlling the electrical power consumption of an accessory device in a vehicle having an engine, a battery, and an power transmission unit adapted to generate electrical power, the method comprising:
   determining whether power is being delivered to and from the battery; and
   operating the accessory device in response to determining that power is delivered to the battery such that the accessory device consumes increased power from the electrical power generated by the power transmission unit.

9. The method of claim 8, further comprising inhibiting the operation of the accessory device in response to determining that the battery delivers power.

10. The method of claim 8, further comprising determining a state of charge of the battery and operating the accessory device in response detecting that the state of charge of the battery is greater than a predetermined threshold such that the accessory device consumes increased power from power stored on the battery.

11. The method of claim 8, further comprising delivering the electrical power generated by the power transmission unit over a high voltage bus to the first portion of the accessory device.

12. The method of claim 11, further comprising stepping down the electrical power generated by the power transmission unit over the high voltage bus to produce stepped down electrical power.

13. A device for controlling a first controller to control an accessory device to consume power in a vehicle having an engine, a battery, and a power transmission unit that generates electrical power, the device comprising:
   a second controller configured to:
      determine an amount of current that is being charged to the battery or discharged from the battery; and
      control the first controller to enable the accessory device to consume the electrical power generated from the power transmission unit in response to determining that current is being charged to the battery.

14. The device of claim 13 wherein the second controller is configured to control the first controller to enable the accessory device to consume the electrical power generated from the power transmission unit and not from the battery in response to determining that current is being charged to the battery.

15. The device of claim 13 wherein the second controller is configured to determine an on/off status for the engine.

16. The device of claim 15 wherein the second controller is further configured to control the first controller to enable the accessory device to consume the electrical power generated from the power transmission unit in response to determining that the amount of current being discharged from the battery is less than a predetermined current amount and that the on/off status for the engine is in an on state.

17. The device of claim 16 wherein the second controller is further configured to control the first controller to reduce operation of the accessory device in response to determining that the amount of current being discharged from the battery is greater than the predetermined current amount.

18. The device of claim 13 wherein the second controller is further configured to determine a state of charge of the battery and to compare the state of charge to a predetermined threshold.

19. The device of claim 17 wherein the second controller is further configured to control the first controller to enable the accessory device to consume electrical power from the battery in response to determining that the state of charge is greater than the predetermined threshold.

* * * * *